(12) United States Patent
Goldfinger

(10) Patent No.: US 9,391,931 B2
(45) Date of Patent: *Jul. 12, 2016

(54) COMMUNICATION SYSTEM AND METHOD

(71) Applicant: AOL Inc., Dulles, VA (US)

(72) Inventor: Yair Goldfinger, New York, NY (US)

(73) Assignee: AOL Inc., Dulles, VA (US)

(*) Notice: Subject to any disclaimer, the term of this patent is extended or adjusted under 35 U.S.C. 154(b) by 455 days.

This patent is subject to a terminal disclaimer.

(21) Appl. No.: 13/902,611

(22) Filed: May 24, 2013

(65) Prior Publication Data

US 2013/0262606 A1 Oct. 3, 2013

Related U.S. Application Data

(63) Continuation of application No. 13/092,680, filed on Apr. 22, 2011, now Pat. No. 8,452,292, which is a continuation of application No. 12/361,618, filed on Jan. 29, 2009, now Pat. No. 7,933,588, which is a continuation of application No. 12/053,967, filed on Mar. 24, 2008, now Pat. No. 7,502,608, which is a continuation of application No. 10/231,445, filed on Aug. 30, 2002, now Pat. No. 7,349,700.

(60) Provisional application No. 60/315,712, filed on Aug. 30, 2001.

(51) Int. Cl.
*H04Q 7/20* (2006.01)
*H04L 12/58* (2006.01)
*H04L 29/12* (2006.01)
*H04M 3/53* (2006.01)

(52) U.S. Cl.
CPC ............ *H04L 51/04* (2013.01); *H04L 29/1216* (2013.01); *H04L 61/157* (2013.01); *H04M 3/53* (2013.01)

(58) Field of Classification Search
CPC ........................................................ H04Q 7/20
See application file for complete search history.

(56) References Cited

U.S. PATENT DOCUMENTS 5,315,636 A 5/1994 Patel
5,673,308 A 9/1997 Akhavan
(Continued)

FOREIGN PATENT DOCUMENTS

WO WO 98/47270 10/1998
WO WO 99/34628 7/1999

OTHER PUBLICATIONS

Cerulean Studios, "Trillian Pro: No Boundaries," (Overview, New Features, Tech Specs, Corporate, Product Tour) 16 pages.
(Continued)

*Primary Examiner* — Kwasi Karikari
*Assistant Examiner* — Randy Peaches
(74) *Attorney, Agent, or Firm* — Finnegan, Henderson, Farabow, Garrett & Dunner, LLP

(57) ABSTRACT

A method for communicating between an operator at an operator device and a user recipient includes enabling an operator of the operator device to enter a device-independent unique identifier for a user recipient by requiring interaction between the operator and the operator device without requiring interaction between the operator and software on the operator device that is designed for communication over an IP-based network. The method includes identifying an IP network address associated with the user recipient based on the device-independent unique identifier and routing a message entered by the operator to the determined IP network address.

21 Claims, 7 Drawing Sheets

(56) References Cited

U.S. PATENT DOCUMENTS

| | | |
|---|---|---|
| 5,793,365 A | 8/1998 | Tang et al. |
| 5,870,744 A | 2/1999 | Sprague |
| 5,872,521 A | 2/1999 | Lopatukin et al. |
| 5,913,032 A | 6/1999 | Schwartz et al. |
| 5,946,616 A | 8/1999 | Schornack et al. |
| 5,946,629 A | 8/1999 | Sawyer et al. |
| 5,946,630 A | 8/1999 | Willars et al. |
| 5,950,193 A | 9/1999 | Kulkarni |
| 5,960,173 A | 9/1999 | Tang et al. |
| 5,978,673 A | 11/1999 | Alperovich et al. |
| 5,999,932 A | 12/1999 | Paul |
| 6,038,451 A | 3/2000 | Syed et al. |
| 6,076,121 A | 6/2000 | Levine |
| 6,091,948 A | 7/2000 | Carr et al. |
| 6,091,958 A | 7/2000 | Bergkvist et al. |
| 6,141,545 A | 10/2000 | Begeja et al. |
| 6,167,256 A | 12/2000 | Yla-Outinen et al. |
| 6,189,026 B1 | 2/2001 | Birrell et al. |
| 6,198,738 B1 | 3/2001 | Chang et al. |
| 6,199,099 B1 | 3/2001 | Gershman et al. |
| 6,247,043 B1 | 6/2001 | Bates et al. |
| 6,260,148 B1 | 7/2001 | Aggarwal et al. |
| 6,269,369 B1 | 7/2001 | Robertson |
| 6,301,609 B1 | 10/2001 | Aravamudan et al. |
| 6,324,402 B1 | 11/2001 | Waugh et al. |
| 6,349,299 B1 | 2/2002 | Spencer et al. |
| 6,360,251 B1 | 3/2002 | Fujita et al. |
| 6,363,248 B1 | 3/2002 | Silverman |
| 6,389,127 B1 | 5/2002 | Vardi et al. |
| 6,392,669 B1 | 5/2002 | Matoba et al. |
| 6,449,344 B1 | 9/2002 | Goldfinger et al. |
| 6,457,044 B1 | 9/2002 | IwaZaki |
| 6,463,471 B1 | 10/2002 | Dreke et al. |
| 6,505,167 B1 | 1/2003 | Horvitz et al. |
| 6,539,421 B1 | 3/2003 | Appelman et al. |
| 6,542,500 B1 | 4/2003 | Gerszberg et al. |
| 6,549,933 B1 | 4/2003 | Barrett et al. |
| 6,549,937 B1 | 4/2003 | Auerbach et al. |
| 6,564,261 B1 | 5/2003 | Gudjonsson et al. |
| 6,564,264 B1 | 5/2003 | Creswell et al. |
| 6,567,796 B1 | 5/2003 | Yost et al. |
| 6,604,133 B2 | 8/2003 | Aggarwal et al. |
| 6,605,016 B2 | 8/2003 | Miyata et al. |
| 6,625,423 B1 | 9/2003 | Wang |
| 6,643,669 B1 | 11/2003 | Novak et al. |
| 6,647,259 B1 | 11/2003 | Boyle |
| 6,654,779 B1 | 11/2003 | Tsuei |
| 6,658,095 B1 | 12/2003 | Yoakum et al. |
| 6,677,968 B1 | 1/2004 | Appelman |
| 6,687,362 B1 | 2/2004 | Lindquist et al. |
| 6,691,162 B1 | 2/2004 | Wick |
| 6,694,353 B2 | 2/2004 | Sommerer |
| 6,701,348 B2 | 3/2004 | Sommerer |
| 6,714,793 B1 | 3/2004 | Carey et al. |
| 6,728,357 B2 | 4/2004 | O'Neal |
| 6,750,881 B1 | 6/2004 | Appelman |
| 6,760,580 B2 | 7/2004 | Robinson |
| 6,788,769 B1 | 9/2004 | Waites |
| 6,848,008 B1 | 1/2005 | Sevanto et al. |
| 2001/0002469 A1 | 5/2001 | Bates |
| 2001/0013050 A1 | 8/2001 | Shah |
| 2002/0049610 A1 | 4/2002 | Gropper |
| 2002/0049751 A1 | 4/2002 | Chen |
| 2002/0052921 A1 | 5/2002 | Morkel |
| 2002/0065894 A1 | 5/2002 | Dalai |
| 2002/0087704 A1 | 7/2002 | Chesnais |
| 2002/0097856 A1 | 7/2002 | Wullert, II |
| 2002/0116461 A1 | 8/2002 | Diacakis |
| 2002/0120687 A1 | 8/2002 | Diacakis |
| 2002/0120697 A1 | 8/2002 | Generous |
| 2002/0137530 A1 | 9/2002 | Karve |
| 2002/0169748 A1 | 11/2002 | Macholda |
| 2002/0178161 A1 | 11/2002 | Brezin |
| 2003/0023691 A1 | 1/2003 | Knauerhase |
| 2003/0058478 A1 | 3/2003 | Aoki |
| 2003/0101343 A1 | 5/2003 | Eaton |
| 2003/0154257 A1 | 8/2003 | Hantsch |
| 2003/0158860 A1 | 8/2003 | Caughey |
| 2003/0158864 A1 | 8/2003 | Samn |
| 2003/0208545 A1 | 11/2003 | Eaton |
| 2003/0217109 A1 | 11/2003 | Ordille |
| 2003/0220946 A1 | 11/2003 | Malik |
| 2003/0220976 A1 | 11/2003 | Malik |
| 2004/0029572 A1 | 2/2004 | Nerot |
| 2004/0044536 A1 | 3/2004 | Fitzpatrick |
| 2004/0054646 A1 | 3/2004 | Daniell |
| 2004/0054736 A1 | 3/2004 | Daniell |
| 2004/0059781 A1 | 3/2004 | Yoakum |
| 2004/0073643 A1 | 4/2004 | Hayes |

OTHER PUBLICATIONS

Cerulean Studios, "Trillian: Your Freedom to Chat," (Overview, Features, Screenshots, Tech Specs) 8 pages.

Information Disclosure statement, dated Jan. 23, 2003, for U.S. Appl. No. 10/231,445.

Office Action, dated Dec. 14, 2006, for U.S. Appl. No. 10/231,445, 33 pages.

Supplemental Information Disclosure Statement, dated Jun. 9, 2005. for U.S. Appl. No. 10/231,445.

YAHOO! Messenger, "Messenger Help," 4 pages.

COMMUNICATION SYSTEM AND METHOD

CROSS REFERENCE TO RELATED APPLICATIONS

This application is a continuation application of and claims priority to U.S. application Ser. No. 13/092,680, filed on Apr. 22, 2011 (now allowed), which is a continuation application of and claims priority to U.S. application Ser. No. 12/361, 618, filed on Jan. 29, 2009 (now U.S. Pat. No. 7,933,588), which is a continuation application of and claims priority to U.S. application Ser. No. 12/053,967, filed on Mar. 24, 2008 (now U.S. Pat. No. 7,502,608), which is a continuation application of and claims priority to U.S. application Ser. No. 10/231,445, filed on Aug. 30, 2002 (now U.S. Pat. No. 7,349, 700) which claims priority under 35 U.S.C. §119(e) to U.S. Provisional Application No. 60/315,712, filed on Aug. 30, 2001. The entire contents of which the above-referenced applications are expressly incorporated herein by reference.

TECHNICAL FIELD

This description relates to a system and method that enable communication between an operator of a telephone device and a user recipient at a network-based system.

BACKGROUND

People may communicate with each other by establishing a telephone call over a telephone communication (or telecommunication) network using telephone devices that are linked to and through the telecommunication network. Additionally, people may communicate with each other using electronic mail or instant messaging over an Internet Protocol (IP) network using computing devices (such as, for example, computers or cellular telephones) that are linked to and through the IP network.

SUMMARY

In one general aspect, a method for communicating between an operator at an operator device and a user recipient includes enabling an operator of the operator device to enter a device-independent unique identifier for a user recipient. The operator is enabled to enter the identifier by requiring interaction between the operator and the operator device without requiring interaction between the operator and software on the operator device that is designed for communication over an IP-based network. The method includes identifying an IP network address associated with the user recipient based on the device-independent unique identifier and routing a message entered by the operator to the determined IP network address.

Implementations may include one or more of the following features. For example, the operator device may include a telephone device.

Enabling the operator of the telephone device may include requiring interaction between the operator and the telephone device without requiring interaction between the operator and software on the telephone device that is designed for Internet communication.

Enabling the operator to enter the device-independent unique identifier may include configuring a server to receive calls from the telephone device when the operator enters a dedicated number associated with the server. The dedicated number associated with the server includes a routing code that identifies the server. Enabling the operator to enter the device-independent unique identifier may include enabling the operator to speak the device-independent unique identifier into a microphone of the telephone device or to type the device-independent unique identifier into a keypad of the telephone device. Enabling the operator to enter the device-independent unique identifier may include configuring a server to receive a dual tone multifrequency signal from the telephone device. Enabling the operator to enter the device-independent unique identifier may include enabling the operator to press a button on the telephone device that is associated with the device-independent unique identifier.

Identifying the IP network address may include mapping the device-independent unique identifier to the IP network address or accessing a database that stores the device-independent unique identifier and the IP network address associated with that device-independent unique identifier.

Routing the message may include routing the message to a computing system associated with the IP network address. Routing the message may include transmitting voice packets of the entered message or transmitting data packets of the entered message. Routing the message may include identifying a computing system currently associated with the identified FP network address.

The method may include formatting the message entered by the telephone device operator into a format suitable for transmission using IP protocol. The method may include receiving the message entered by the operator. The message entered by the operator may include a speech signal.

Enabling the operator to enter the device-independent unique identifier may include receiving a dual tone multifrequency signal from the telephone device.

The method may include enabling the operator to enter the message using the telephone device or by speaking into a microphone in the telephone device.

The operator device may include a television device, a land-based telephone device, or a mobile hand-held computing device.

In another general aspect, a method for communicating between an operator at an operator device and a user recipient includes receiving from the operator device a data structure including a first portion and a second portion. The first portion of the data structure identifies the second portion of the data structure as uniquely identifying a user recipient. The method includes mapping the second portion to a network address of a computing system currently connected to a network on which the user recipient is identifiable. The method also includes routing a message received from the operator device to the computing system at the network address.

Implementations may include one or more of the following features. For example, the operator device may include a telephone device. The method may include converting the message from a format suitable for telephonic communication to a format suitable for routing to the computing system.

Mapping of the second portion to a network address may include accessing a database that stores the network address of the computing system currently connected to the network on which the user is identifiable.

The message may include a short messaging system (SMS) message or a multimedia message (MMM).

The data structure may include a dual tone multifrequency signal.

The method may further include enabling the operator to enter the message using the telephone device.

The data structure may be received from a mobile carrier or a land-based carrier.

The method may include parsing the data structure to determine the first portion and the second portion. The may also include prompting the operator to enter the data structure at the telephone device.

The operator device may include a television device, a standard land-based telephone device, or a mobile hand-held computing device.

In another general aspect, a method for communicating between an operator at an operator device and a user recipient includes receiving an identifier from the operator device, the identifier uniquely identifying a user recipient. The method includes mapping the identifier to a network address of a computing system currently connected to a network on which the user recipient is identifiable. The method also includes receiving an audio message from the operator device and routing the audio message to the computing system at the network address.

Implementations may include one or more of the following features. For example, the operator device may include a telephone device. The method may include converting the received audio message from a format suitable for communication over a telephone network into a format suitable for routing to the computing system. Mapping the identifier to a network address may include accessing a database that stores the network address of the computing system currently connected to the network on which the user is identifiable.

The method may include enabling the operator to enter the audio message at the telephone device. The method may include prompting or enabling the operator to enter the identifier using the telephone device.

The operator device may include a television device, a standard land-based telephone device, or a mobile hand-held computing device.

Aspects of the techniques and systems can include one or more of the following advantages. The communication system and method enables a user at a telephone device to initiate communication with other devices connected to an IP-based network. The operator only needs to remember or store a single telephone number to access the negotiating device. The operator then enters the message and the unique identifier for the user recipient.

Other features and advantages will be apparent from the description, the drawings, and the claims.

DESCRIPTION OF DRAWINGS

Like reference symbols in the various drawings indicate like elements.

DETAILED DESCRIPTION

A communication system is described that permits an operator at a telephone device to send a message through a telephone-based communication link to a user recipient located at a computing device. The message may include a text message or a voice message. In either case, the operator uses the telephone device to provide data including the message, a unique identifier of the user recipient, and a routing code for a gateway device that enables communication of the message over a data-based network other than a telephone network. As will be described in greater detail, the unique identifier for the user recipient may be signaled based on the entry of the routing code for the gateway device.

For brevity, several elements in the figures described below are represented as monolithic entities. However, as would be understood by one skilled in the art, these elements each may include numerous interconnected computers and components designed to perform a set of specified operations and/or dedicated to a particular geographical region.

Figure 1:
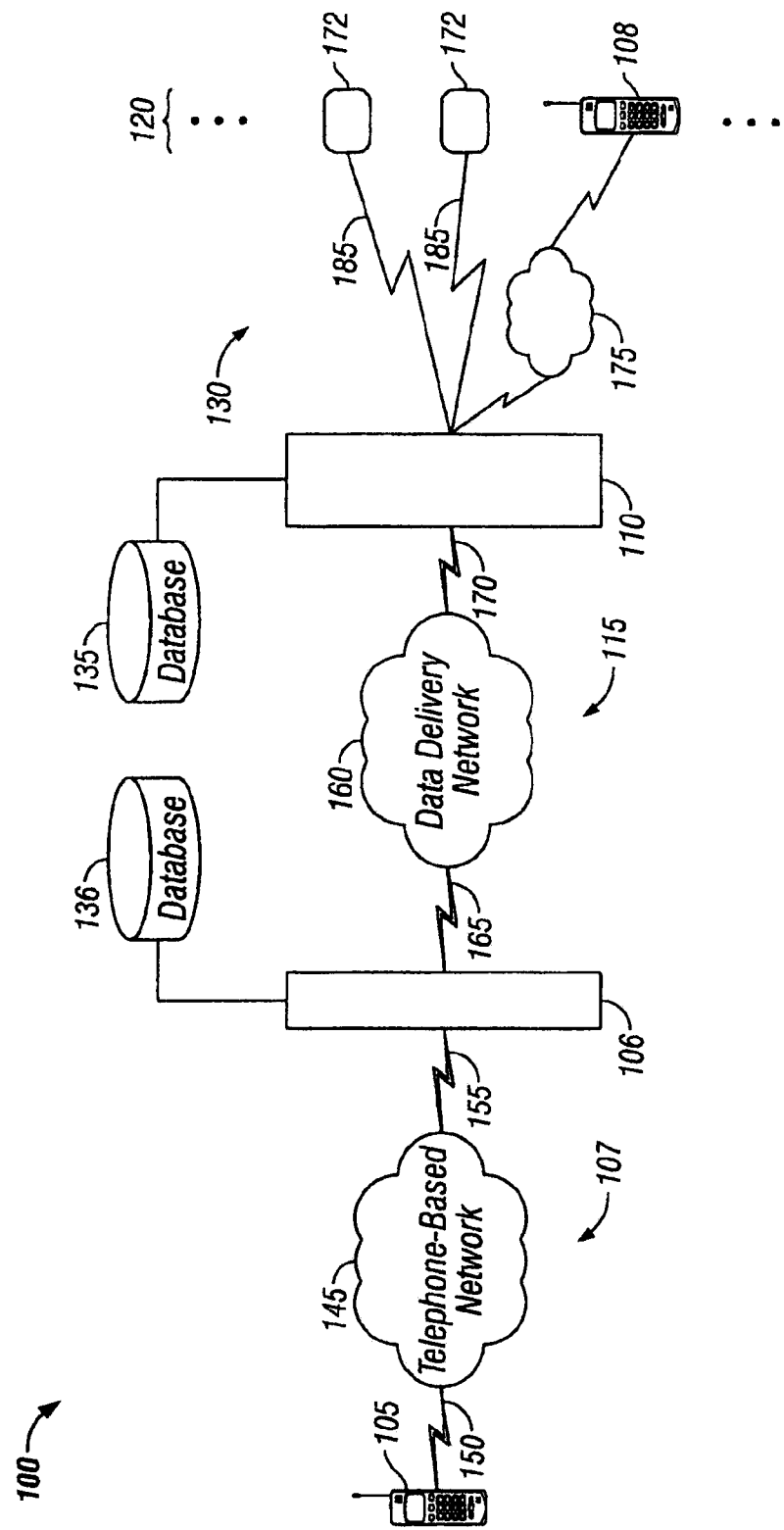
FIG. 1 is a block diagram of a communication system.

Referring to FIG. 1, a communication system 100 includes a telephone device 105, a negotiating device 106 within a telephone-based communication link 107, a gateway device 110 that communicates with the negotiating device 106 through a data-based communication link 115 that is not telephone-based, one or more computing systems 120 that communicate with the gateway device 110 through a communication link 130, a network database 135 that is accessed by the gateway device 110, and a negotiating database 136 that is accessed by the negotiating device 106.

Briefly, when an operator at the telephone device 105 dials a number, the telephone device 105 produces a data structure of that number, which is then routed to the negotiating device 106. The negotiating device 106 receives the data structure, which has been routed through the telephone-based communication link 107 from the telephone device 105, perceives one or more portions of the data structure and looks up those perceived portions in the negotiating database 136 to determine where to direct or route the data structure. If the negotiating device 106 determines that the data structure includes a telephone number, then it routes a received message through a telephone-based communication link (either link 107 or other link not shown) to an operator at a receiving telephone device (not shown). If the negotiating device 106 determines that the data structure does not include a telephone number, then the negotiating device 106 routes the data structure and the received message through the data-based communication link 115 to the gateway device 110. The negotiating device 106 may remove information from the data structure before routing to enable the gateway device 110 to properly read the data structure. Alternatively, the negotiating device 106 may simply send all of the information in the original data structure to the gateway device 110. Furthermore, the negotiating device 106 may alter the format of the data structure to enable the data structure to be routed through the data-based communication link 115. In any case, the gateway device 110 perceives one or more portions of the data structure, looks up those perceived portions in the network database 135 and delivers the received message to an identified computing system 120.

The telephone-based communication link 107 may include analog or digital wired and wireless telephone-based networks 145, such as, for example, plain old telephone service (POTS), asymmetric digital subscriber line (ADSL), public switched telephone network (PSTN), integrated services digital network (ISDN), and digital subscriber line (xDSL). The telephone-based communication link 107 may include communication pathways 150, 155 that enable communication through the one or more telephone-based networks 145. Each of the communication pathways 150, 155 may include, for example, a wired, wireless, cable or satellite communication pathway.

Additionally, the telephone-based communication link 107 includes the negotiating device 106. The negotiating device 106 enables delivery of messages from the telephone device 105 to the gateway device 110 through the data-based communication link 115. The negotiating device 106 acts as a router that examines the data structure received from the telephone device 105, looks up information in the database 136 to determine where the message should be routed, and then routes the message and the data structure or a portion of the data structure to the appropriate gateway device 110. Thus, the negotiating device 106 is configured to receive information through the telephone-based communication link 107 and to deliver information through the data-based communication link 115. In one implementation, the negotiating device 106 has an assigned routing code that may be dialed by the user at the telephone device 105 and that is recognized by a telephone carrier within the telephone-based network 145 as corresponding to the negotiating device 106. For instance, entry by an operator of #427 signals to the telephone carrier that the message should be routed to the negotiating device 106. If the telephone carrier is a mobile short messaging system (SMS) carrier, the negotiating device 106 may be configured to receive SMS messages from telephone device 105 over telephone-based communication link 107. Alternatively, the negotiating device 106 may be configured to receive voice data from the telephone device 105 over the telephone-based communication link 107. In another implementation, the negotiating device 106 may be configured to prompt the operator at the telephone device 105 for information that the negotiating device 106 requires when accessing the negotiating database 136.

The data-based communication link 115 may include one or more data-based delivery networks 160, for example, IP-based networks (such as the Internet, World Wide Web, WANs, LANs, analog or digital networks,); X.25 protocol-based networks, or other non-telephone-based delivery mechanisms for carrying data or information to the gateway device 110. The data-based communication link 115 may include data-based communication pathways 165, 170 that enable communication through the one or more data-based delivery networks 160. Each of the communication pathways 165, 170 may include, for example, a wired, wireless, cable or satellite communication pathway.

The gateway device 110 enables delivery of messages from the data-based communication link 115 to the computing system 120 through the communication link 130. The gateway device 110 may act as a router that examines one or more portions of the data structure received from the negotiating device 106, looks up information in the database 135 to determine where the message should be routed, and then routes the message to the appropriate computing system 120. Thus, the gateway device 110 is configured to receive information through the data-based communication link 115.

The communication link 130 typically includes some type of delivery network making a direct or an indirect communication between the gateway device 110 and the computing device 120, irrespective of physical separation among these devices. Examples of a delivery network include IP-based networks such as the Internet, the World Wide Web, WANs, LANs; analog or digital wired and wireless telephone networks (that is, PSTN, ISDN, and xDSL); radio; television; cable; satellite; and/or other delivery mechanisms for carrying data or information to a particular computing device 120.

The computing system 120 is a system at which a user recipient can receive messages. For instance, the computer system 120 may include one or more telephone devices 108 (call or standard) that each interface with the gateway device 110 through a telephone delivery network 175. Or, the computer system 120 may include one or more standard computing devices 172, as described below with respect to FIG. 3, that each interface with the gateway device 110 through a delivery network 185 such as, for example, IP-based networks or cable networks. In any case, computing system 120 is connected to the gateway device 110 through the communication link 130.

Figure 2:
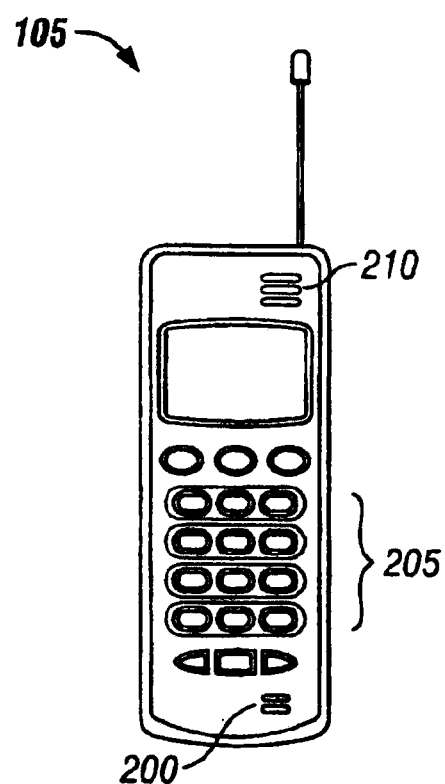
FIG. 2 is a block diagram of a telephone device used in the communication system of FIG. 1.

Referring to FIG. 2, the telephone device 105 or 108 may be a standard telephone, such as, for example, a cordless telephone, a corded telephone, a payphone, or a cellular telephone. The telephone device 105 or 108 includes internal circuitry connected to user input devices to receive input and to transmit and receive a telephone message. The telephone device 105 or 108 includes a speaker, for example, at the back or front of the device 105 or 108 (not shown) for emitting audio signals and a microphone, for example, positioned, beneath openings 200 in the housing of the telephone device 105 or 108, for receiving audio signals. The telephone device 105 also includes a keypad 205 for enabling the operator to dial a number or select a letter. The telephone device 105 may include storage for addresses or the unique identifiers. The telephone device 105 may be configured with speed dial buttons that enable the operator to press a single button to dial two or more numbers.

The telephone device 105 also may include a dedicated input device 210 on the surface of its housing to receive input from the operator that indicates that the operator wishes to send a message to a user recipient at a computing system 120. The dedicated input device 210 may be pre-programmed to enter a set of numbers or the dedicated input device 210 may be configurable by an operator upon purchase of the telephone device 105. The telephone device 105 may also include software and circuitry configured for network communication and/or software and circuitry configured for voice recognition.

In the description, the communication system 100 is described as including a telephone device 105. However, in other implementations, the communication system 100 may instead include an operator device, such as, for example, a television device, a cellular or land-based telephone device, or a mobile hand-held computing device such as a personal digital assistant. In these other implementations, the telephone-based communication link 107 is not necessarily telephone-based, but may be, for example, cable-based or wireless-based depending on what type of device the operator is using.

Figure 3:
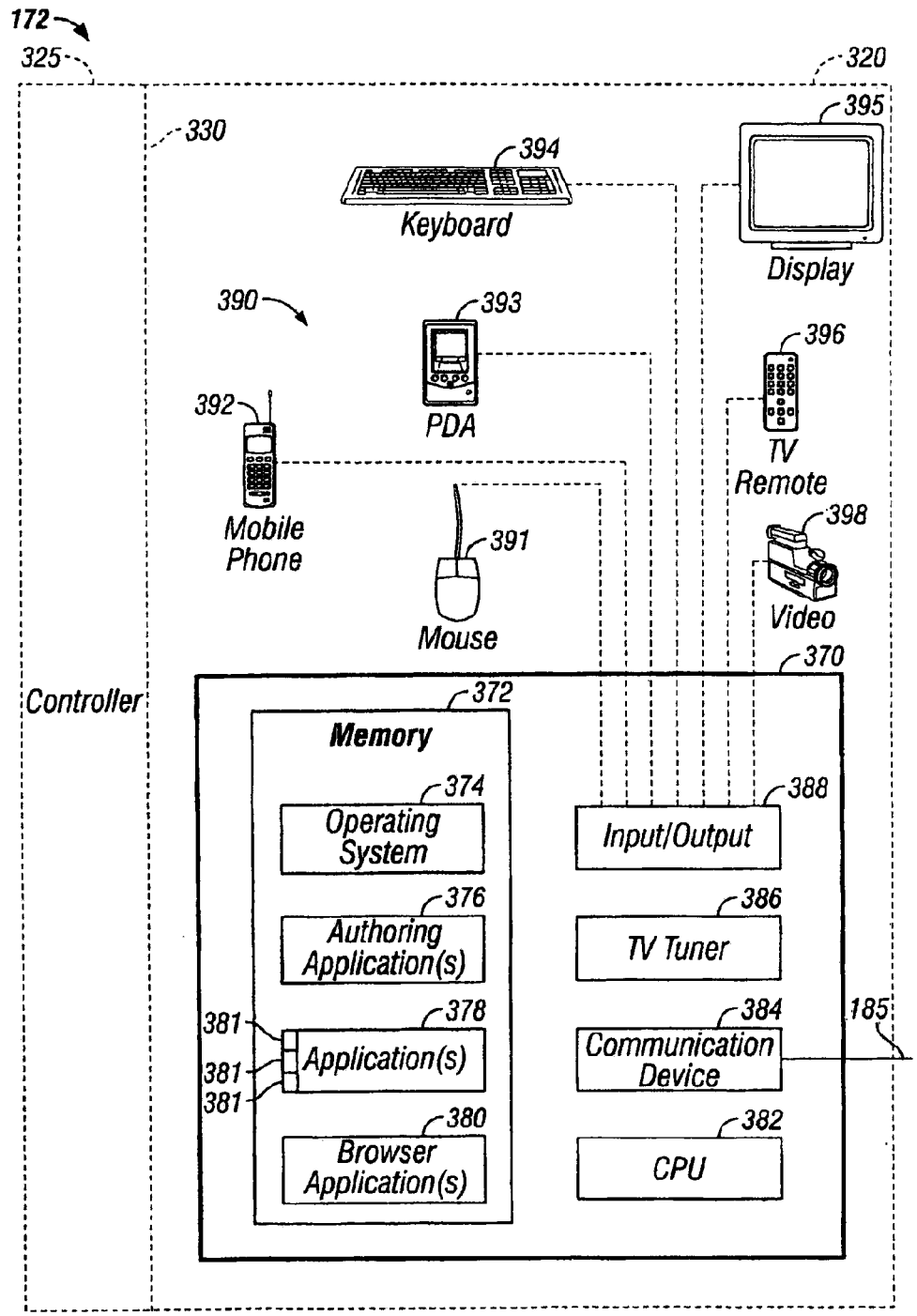
FIG. 3 is an expansion of a computing system shown in the block diagram of FIG. 1.

Referring also to FIG. 3, the computing device 172 typically includes one or more devices 320 and/or controllers 325. For example, the computing device 172 may include one or more general-purpose computers (that is, personal computers), one or more special-purpose computers (that is, devices specifically programmed to communicate with each other and/or the computing device 172), or a combination of one or more general-purpose computers and one or more special-purpose computers. The computing device 172 may be arranged to operate within or in concert with one or more other systems, such as, for example, one or more Local Area Networks (LANs) and/or one or more Wide Area Networks (WANs).

The device 320 is generally capable of executing instructions under the command of the controller 325. The device 320 is connected to the controller 325 by a wired or wireless data pathway 330 capable of delivering data.

The device 320 and the controller 325 each typically include one or more hardware components and/or software components. An example of a device 320 is a general-purpose computer (that is, a personal computer) capable of responding to and executing instructions in a defined manner. Other examples include a special-purpose computer, a workstation, a server, a device, a component, other physical or virtual equipment or some combination thereof capable of responding to and executing instructions.

An example of controller 325 is a software application loaded on the device 320 for commanding and directing communications enabled by the device 320. Other examples include a program, a piece of code, an instruction, a device, a computer, a computer system, or a combination thereof, for independently or collectively instructing the device 320 to interact and operate as described. The controller 325 may be embodied permanently or temporarily in any type of machine, component, physical or virtual equipment, storage medium, or propagated signal capable of providing instructions to the device 320.

The device 320 typically includes a general purpose computer 370 having an internal or external storage 372 for storing data and programs such as an operating system 374 (for example, DOS, Windows®, Windows® 95, Windows® 98, Windows® 2000, Windows® NT, Windows® Millennium Edition, Windows® XP; OS/2, and Linux) and one or more application programs.

Examples of application programs include authoring applications 376 (for example, word processing, database programs, spreadsheet programs, presentation programs, and graphics programs) capable of generating documents or other electronic content; client applications 378 (for example, AOL client, CompuServe client, AIM client, AOL TV client, ISP client, and ICQ client) capable of communicating with other computer users, accessing various computer resources, and viewing, creating, or otherwise manipulating electronic content; and browser applications 380 (for example, Netscape's Navigator and Microsoft's Internet Explorer) capable of rendering standard Internet content.

Additionally, the device 320 includes one or more plug-in applications 381 that are installed and used as a part of the client applications 378. The plug-in applications 381 enable the device 320 to transmit messages to and from the gateway device 110. Plug-in applications 381 include one or more of: a description of internal protocols; a message application that is activated when a message is received through the gateway device 110 that originated from the telephone device 105; an interface application that implements user interface components and business rules; and a status application that establishes the status of the message based on information from the telephone application and/or the message itself.

The general-purpose computer 370 also includes a central processing unit (CPU) 382 for executing instructions in response to commands from the controller 325. In one implementation, the controller 325 includes one or more of the application programs installed on the internal or external storage 372 of the general-purpose computer 370. In another implementation, the controller 325 includes application programs externally stored in and executed by one or more device(s) external to the general-purpose computer 370.

The general-purpose computer typically will include a communication device 384 for sending and receiving data. One example of the communication device 384 is a modem. Other examples include a transceiver, a set-top box, a communication card, a satellite dish, an antenna, or another network adapter capable of transmitting and receiving data over the communication link 130 through a wired or wireless data pathway. The general-purpose computer 370 also may include a television (TV) tuner 386 for receiving television programming in the form of broadcast, satellite, and/or cable TV signals. As a result, the device 320 can selectively and/or simultaneously display network content received by communication device 384 and television programming content received by the TV tuner 386.

The general-purpose computer 370 typically will include an input/output interface 388 to enable a wired or wireless connection to various peripheral devices 390. Examples of peripheral devices 390 include, but are not limited to, a mouse 391, a mobile phone 392, a personal digital assistant (PDA) 393, a keyboard 394, a display monitor 395 with or without a touch screen input, and/or a TV remote control 396 for receiving information from and rendering information to subscribers. Other examples may include voice recognition and synthesis devices.

Although FIG. 3 illustrates devices such as a mobile telephone 392, a PDA 393, and a TV remote control 396 as being peripheral with respect to the general-purpose computer 370, in another implementation, such devices may themselves include the functionality of the general-purpose computer 370 and operate as the device 320. For example, the mobile phone 392 or the PDA 393 may include computing and networking capabilities, and may function as a device 320 by accessing one or more delivery networks within the communication link 130 and by communicating with other computing devices 172 and/or the gateway device 110.

Figure 4:
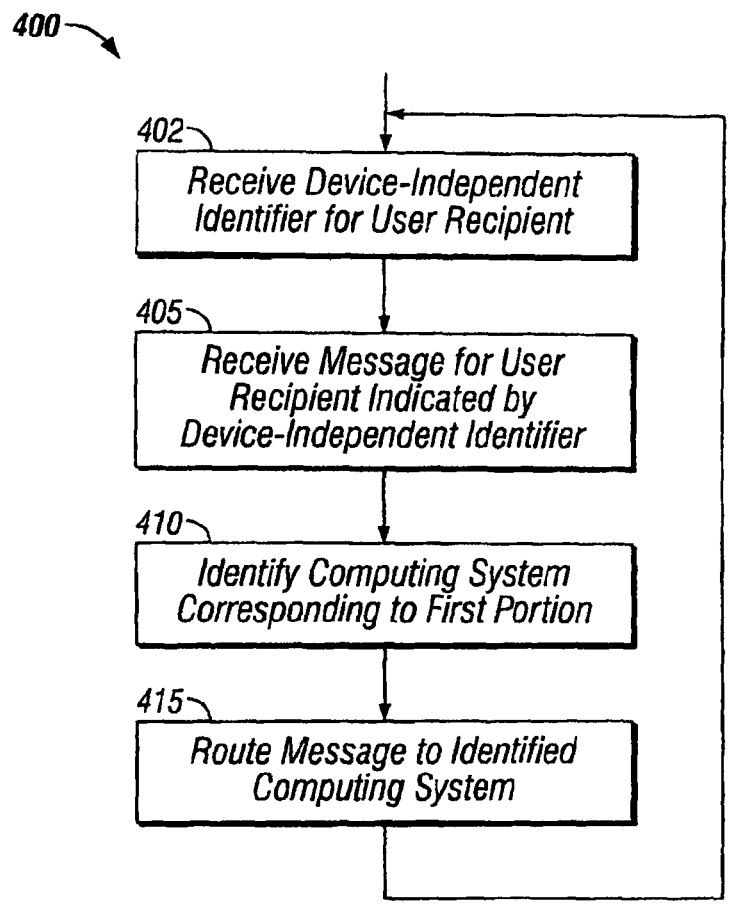
FIGS. 4, 7, and 8 are flow charts of procedures performed by the communication system of FIG. 1.

Referring to FIG. 4, the gateway device 110 performs a procedure 400 for enabling communication between the operator at the telephone device 105 and a user recipient at the computing system 120. Initially, the gateway device 110 receives a device-independent unique identifier for a user recipient (step 402). While the operator is required to interact with the telephone device 105 when entering this unique identifier, the operator is not required to interact with software on the telephone device 105 that is designed for communication over an Internet protocol (IP)-based network. The operator can interact with the telephone device 105 by typing a number using the keypad 205 or by accessing a number stored in memory within the telephone device 105.

Figure 5:
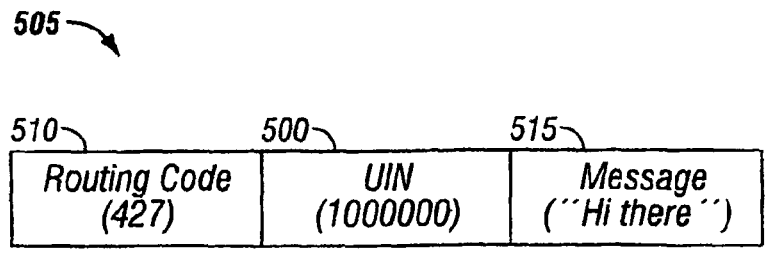
FIG. 5 is a block diagram of data and/or a data structure transmitted through the communication system of FIG. 1.

Referring to FIG. 5, the gateway device 110 receives the device-independent unique identifier 500 in the form of a data packet 505 received at and routed from the negotiating device 106. The gateway device 110 may receive the routing code 510 if the negotiating device 106 does not strip the routing code 510 from the data packet 505 before delivery through the data-based communication link 115. The gateway device 110 enables the entered message 515 to be sent to the user recipient indicated by the entered device-independent unique identifier (step 405).

Figure 6:
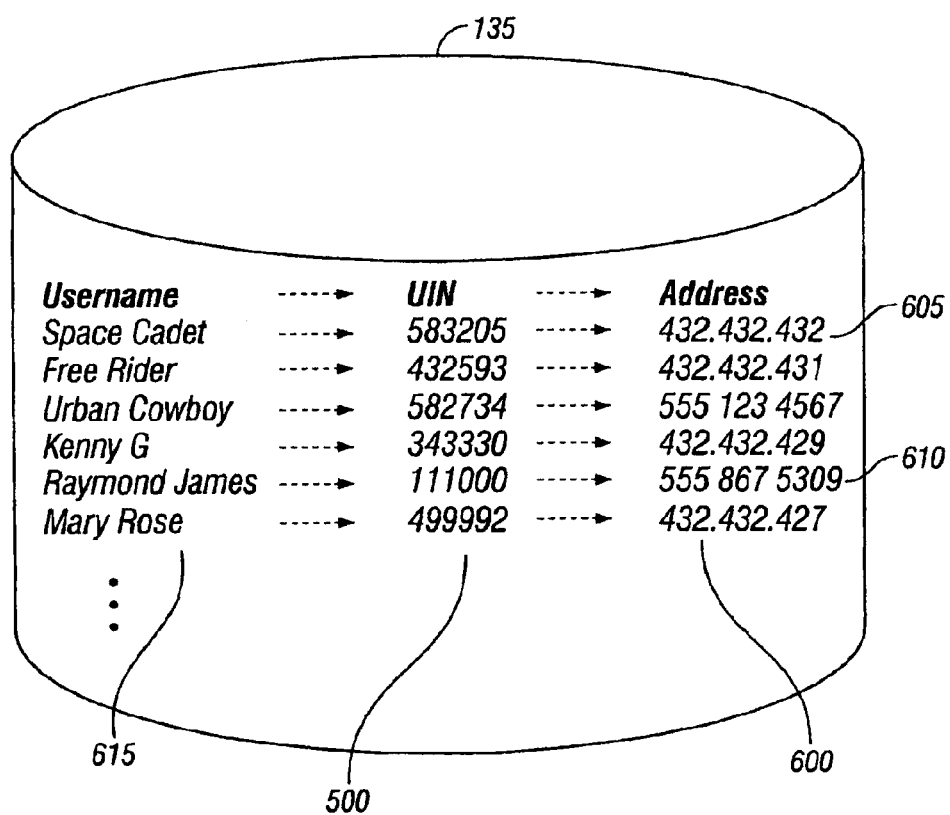
FIG. 6 is a block diagram of a mapping used in the communication system of FIG. 1.

Next, with reference to FIG. 6, the gateway device 110 identifies a recipient address 600 that may be, for example, an (IP) network address 605 or a telephone number 610 associated with the user recipient (step 410). The gateway device 110 may perform such identification by accessing or searching the network database 135, which stores the device-independent unique identifiers 500 for user recipients and maps each unique identifier 500 to a recipient address 600. The unique identifier 500 for a user recipient is a numeric sequence chosen by or given to the user recipient of a network during registration for use as an identifier of the user recipient when that user recipient is connected to the network or otherwise. The unique identifier 500 is device-independent in that the user recipient may be identified at different devices configured to connect to the network, regardless of the identification or location of the device. As shown, the unique identifier may be a unique identification number (UIN). The UIN is recognized by the computing system 120 and by other computing systems 120 that communicate with each other through the gateway device 110. The recipient address 600 that maps to a particular unique identifier 500 corresponds to a computing system 120 currently connected to the gateway device 110 that enables identification of the user recipient and/or her status. Once the identification is made, the gateway device 110 routes entered message to the identified recipient address and a computing system 120 at which the user recipient is currently identified (step 415).

The message may be entered at the telephone device 105 in any suitable implementation. However, two particular implementations are described below. In the first implementation, the message is entered as a voice message in which the operator speaks the message into the microphone of the telephone device 105. In the second implementation, the message is entered as a text message using, for example, the keypad 205 of the telephone device 105.

Figure 7:
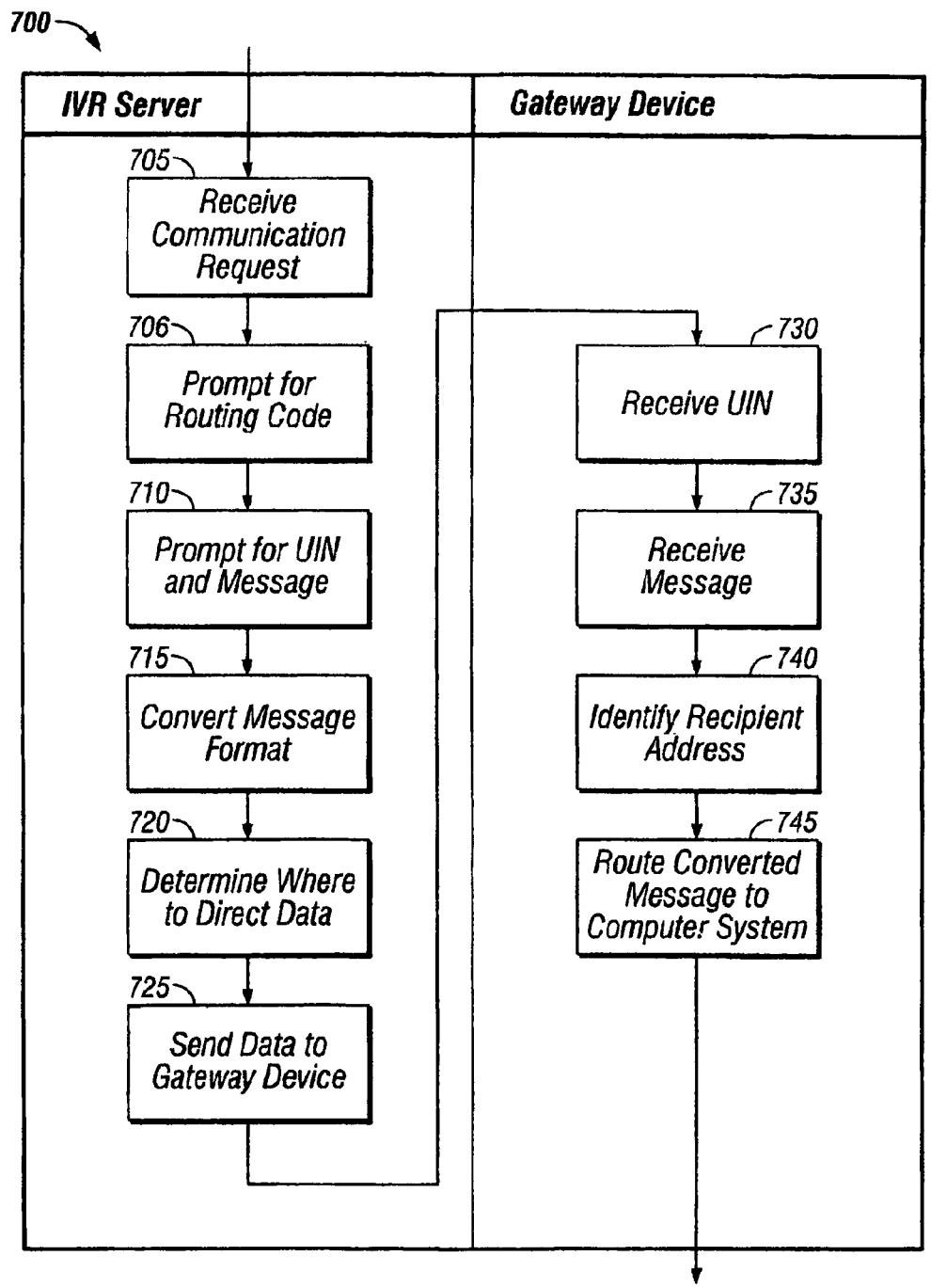

Referring also to FIG. 7, in one implementation, the communication system 100 routes a message 515 to a computing system 120 according to a procedure 700. The procedure 700 is described as being performed by the negotiating device 106, which acts as an interactive voice response (IVR) server that receives an audio message and a data packet 505 from the telephone device 105, and the gateway device 110, which receives the UIN 500 and the audio message 515 from the IVR server 106. Nevertheless, the procedure 700 may be performed by other systems or combinations of systems within the communication system 100.

Initially in the procedure 700, the IVR server 106 receives a communication request from the operator (step 705). For example, the operator dials a telephone number associated with the IVR server 106 and a telephone call is effectively established through the telephone-based communication link 107 between the IVR server 106 and the telephone device 105. If a routing number 510 has not yet been received, the IVR server 106 prompts the operator for the routing number 510 (step 706), which will enable the IVR server 106 to determine where to direct the data. The routing code 510 may be a part of a data structure 505 produced by the telephone device 105. If the IVR server 106 received the routing code 510 without the message 515 or the UIN 500 or if the gateway device 110 receives the message 515 without the UIN 500, the IVR server 106 may, at any time, prompt the operator for this additional information (step 710) by, for example, sending an audio signal to the telephone device 105 requesting that the operator enter her message or UIN. Additionally, the IVR server 106 converts the received audio message from a format suitable for communication over the telephone-based communication link 107 into a format suitable for routing to the computing system 120 through the data-based communication link 115 (step 715). For example, the IVR server 106 may use voice over IP (VoIP) to accomplish this conversion.

The IVR server 106 accesses the negotiating database 136 to determine where to direct or route the data (step 720). If the negotiating device 106 determines that the data structure includes a telephone number, then it routes the message through a telephone-based communication link (for example, link 107) to an operator at a receiving telephone device (not shown). If the negotiating device 106 determines that the data structure is not a telephone number but instead corresponds to a number associated with the gateway device 110, then the IVR server 106 routes or delivers the data (which includes the converted message 515 and the UIN 500) through the data-based communication link 115 to the gateway device 110 (step 725).

Upon receipt of the UIN 500 (step 730) and the converted audio message (step 735) from the IVR server 106, the gateway device 110 identifies the recipient address 600 of a computing system 120 currently connected to the network on which the user recipient is identifiable and that corresponds to the received UIN 500 (step 740) by, for example, looking up the UN 500 in the network database 135 and matching the UIN 500 with the recipient address 600. The gateway device 110 routes the converted audio message to the computing system 120 at the recipient address 600 (step 745).

Figure 8:
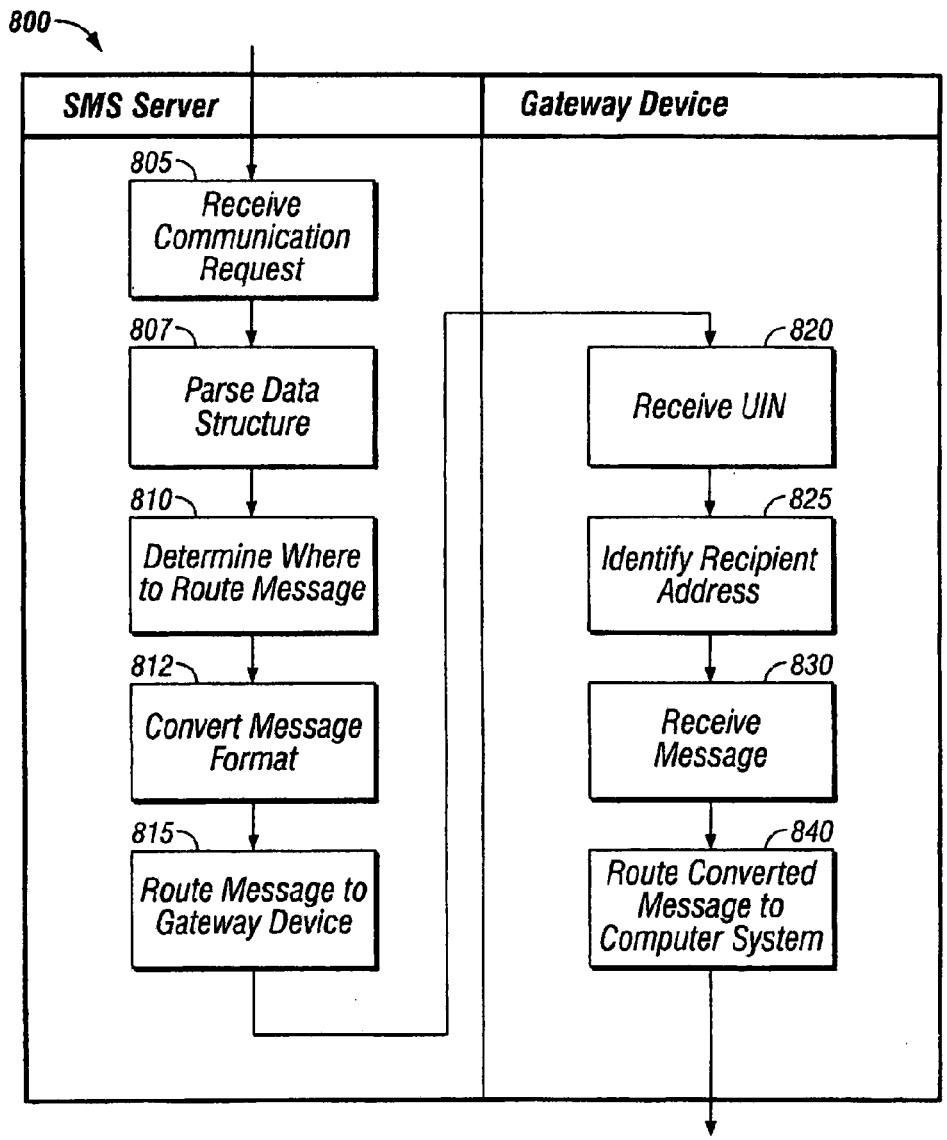

Referring also to FIG. 8, in another implementation, the communication system 100 routes a message 515 to a computing system 120 according to a procedure 800. The negotiating device 106 acts as data server (for example, a short message system (SMS) server or a multimedia message system (MMM) server) that receives the message 515 in the appropriate format and the unique identifier 500 along with the routing code 510. Thus, if the data server is an SMS server, the message 515 is formatted as an SMS message and if the data server is an MMM server, the message 515 is formatted as an MMM message. For clarity, the description below assumes that the text server is a SMS server 106 that receives SMS messages.

The SMS server 106 acts as an intermediary server that negotiates and maps the SMS message 515 to the gateway device 110, which ultimately delivers the SMS message 515 to the computing system 120. In this implementation, the telephone device 105 may be cellular telephone and the telephone-based communication link 107 may be a signaling system 7 (SS7) link used in a global system for mobile (GSM) communication link, thus enabling the cellular telephone to transmit SMS messages to the gateway device 110. The telephone-based communication link 107 may include, as an alternative to the GSM, a TDMA or CDMA.

The SMS server 106 receives from the telephone device 105 a communication request that may be in the form of the data structure 505 (step 805). The operator enters the data using, for example, the keypad 205 of the telephone device 105. The data structure includes a first portion (that is, the routing code 510) that enables the SMS server 106 to route the call and a second portion (that is, the unique identifier or UIN 500) that will be used by the gateway device 110 to identify the recipient address 600. The routing code 510 may be allocated by the SMS carrier for SMS messages over the GSM carrier to the gateway device 110. The routing code 510, as discussed, identifies or signals to the SMS server 106 and/or the gateway device 110 that the UIN 500 in the data uniquely identifies the user recipient. Thus, the first portion may have been parsed by the GSM carrier as including a country code, followed by a prefix for the GSM carrier, followed by a signaling number allocated for the host server for SMS messages. Alternatively or additionally, the SMS server 106 parses the call (step 807) to determine that the message 515 is to be routed to a user recipient because the routing code 510 indicates the unique identifier 500 in the data structure.

For example, as shown in FIG. 5, the data structure 505 may be "27 83 427 1000000 <message>," where "27" is a country code, "83" is a prefix for the GSM carrier, "427" is the first portion, that is, the routing code 510 allocated by the carrier to the gateway device 110 that signals to the gateway device 110 that the second portion, "1000000" uniquely identifies the user recipient. In this example, "<message>" is the SMS message.

The SMS server 106 accesses the negotiating database 136 to determine where to route the call based on the routing code 510 (step 810). If needed, the SMS server 106 converts the SMS message from a format suitable for communication over the telephone-based communication link 107 into a format suitable for routing to the computing system 120 over the data-based communication link 115 and the communication link 130 (step 812). Then, the SMS server 106 routes the converted message with the unique identifier to the gateway device 110 if the routing code 510 maps to the gateway device 110 (step 815).

Upon receipt of the UIN 500 (step 820), the gateway device 110 maps the UIN 500 of the data structure to a recipient address 600 of a computing system 120 currently connected to a network on which the user recipient is identifiable (step 825). The gateway device 110 receives the SMS message (step 830). Then, the gateway device 110 routes the SMS message to the computing system 120 at the recipient address (step 840).

The gateway device 110 may prompt the operator to enter data at the telephone device 105 if the operator has recently received an SMS message from a user at a computing system 120.

Other implementations are within the scope of the following claims. For example, the WR server may perform speech recognition on the audio message to convert the audio message into a text message for transmission to the computing system 120. Likewise, the IVR server may enable the operator to speak the identifier into the microphone on the telephone device 105 and may perform speech recognition on the spoken identifier to determine the identifier.

In another implementation, the data-based communication link 115 may strip the first portion or routing code 515 from the data structure 500 before sending to the gateway device 110. In this way, the gateway device 110 receives a data structure 500 that includes the second portion or UIN 505 and the message 510.

What is claimed is:

1. A method of sending messages, the method comprising:
   receiving a data structure from a mobile device, the data structure comprising a device-independent unique recipient identifier;
   accessing a routing database;
   determining, based on a routing code, a routing destination for the data structure from the routing database;
   converting, by at least one processor, a message body into a compatible format based on the determined routing destination;
   accessing an identification database;
   determining, based on the device-independent unique recipient identifier, a destination address for the data structure from the identification database; and
   forwarding, over a communication network, a converted message body to a receiving device corresponding to the determined destination address.

2. The method of sending messages according to claim 1, further comprising receiving and processing the data structure at a negotiating device.

3. The method of claim 1, wherein forwarding the data structure comprises routing at least a part of the data structure through a telephone-based communication link.

4. The method of claim 1, wherein forwarding the data structure comprises routing at least a part of the data structure through a data-based communication link.

5. The method of claim 2, wherein the negotiating device is configured to receive short message service messages.

6. The method of claim 2, wherein the negotiating device is configured to receive voice messages.

7. The method of claim 2, wherein the negotiating device removes information from the data structure before routing the data structure to the determined destination address.

8. The method of claim 2, wherein the negotiating device alters the format of the data structure to enable routing through a data-based communication link.

9. A computerized system for sending messages, the system including at least one processor and a storage device that stores a set of instructions, the set of instructions being executable by the at least one processor to:
   receive a data structure from a mobile device, the data structure comprising a device-independent unique recipient identifier;
   access a routing database;
   determine, based on a routing code, a routing destination for the data structure from the routing database;
   convert a message body into a compatible format based on the determined routing destination;
   access an identification database;
   determine, based on the device-independent unique recipient identifier, a destination address for the data structure from the identification database; and
   forward the converted message body to a receiving device corresponding to the determined destination address.

10. The system of claim 9, wherein the data structure is received and processed at a negotiating device.

11. The system of claim 9, wherein the data structure is routed through a telephone-based communication link.

12. The system of claim 9, wherein the data structure is routed through a data-based communication link.

13. The system of claim 10, wherein the negotiating device is configured to receive short message service messages.

14. The system of claim 10, wherein the negotiating device is configured to receive voice messages.

15. The system of claim 10, wherein the negotiating device removes information from the data structure before routing the data structure to the determined destination address.

16. The system of claim 10, wherein the negotiating device alters the format of the data structure to enable routing through a data-based communication link.

17. A tangible, non-transitory computer-readable medium storing a set of instructions that, when executed by at least one processor, causes the at least one processor to perform a method comprising:
   receiving a data structure from a mobile device, the data structure comprising a device-independent unique recipient identifier;
   accessing a routing database;
   determining, based on a routing code, a routing destination for the data structure from the routing database;
   converting a message body into a compatible format based on the determined routing destination;
   accessing an identification database;
   determining, based on the device-independent unique recipient identifier, a destination address for the data structure from the identification database; and
   forwarding, over a communication network, a converted message body to a receiving device corresponding to the determined destination address.

18. The computer-readable medium of claim 17, wherein the data structure is routed through a telephone-based communication link.

19. The computer-readable medium of claim 17, wherein the data structure is routed through a data-based communication link.

20. The computer-readable medium of claim 17, wherein the data structure is received and processed at a negotiating device.

21. The computer-readable medium of claim 20, wherein the negotiating device is configured to receive short message service messages.

* * * * *